United States Patent
Dang

(10) Patent No.: US 11,047,577 B2
(45) Date of Patent: Jun. 29, 2021

(54) CHIMNEY STARTER BOOSTER

(71) Applicant: Hoang Dang, Mansfield, TX (US)

(72) Inventor: Hoang Dang, Mansfield, TX (US)

( * ) Notice: Subject to any disclaimer, the term of this patent is extended or adjusted under 35 U.S.C. 154(b) by 0 days.

(21) Appl. No.: 16/743,160

(22) Filed: Jan. 15, 2020

(65) Prior Publication Data

US 2021/0140642 A1 May 13, 2021

Related U.S. Application Data

(63) Continuation-in-part of application No. 16/680,326, filed on Nov. 11, 2019.

(51) Int. Cl.
  *F24B 15/00* (2006.01)
  *A47J 37/07* (2006.01)
  *F23L 1/02* (2006.01)

(52) U.S. Cl.
  CPC ........... *F24B 15/005* (2013.01); *A47J 37/079* (2013.01); *F23L 1/02* (2013.01); *F23L 2700/001* (2013.01)

(58) Field of Classification Search
  CPC ....... F23L 1/02; F23L 2700/001; F24B 15/05; A47J 37/079
  USPC ...................................................... 126/25 B
  See application file for complete search history.

(56) References Cited

U.S. PATENT DOCUMENTS

| | | | | |
|---|---|---|---|---|
| 4,516,561 A | * | 5/1985 | Stawski | A47J 37/0754 126/25 B |
| 5,168,860 A | * | 12/1992 | Kibourian | A47J 37/0754 126/15 A |
| 5,176,124 A | * | 1/1993 | Wrasse | A47J 37/0704 126/25 R |
| 8,596,258 B1 | * | 12/2013 | Gonzalez | A47J 37/079 126/25 B |
| 8,662,067 B2 | * | 3/2014 | Warner | F23Q 7/02 126/25 B |
| 2007/0131216 A1 | * | 6/2007 | Le Breis | A47J 37/079 126/25 R |
| 2012/0111313 A1 | * | 5/2012 | Stover | A47J 37/079 126/25 B |
| 2015/0272388 A1 | * | 10/2015 | Jorgensen | F23Q 7/04 126/25 B |
| 2017/0202395 A1 | * | 7/2017 | Lomonaco | A47J 37/079 |

* cited by examiner

*Primary Examiner* — Vivek K Shirsat
*Assistant Examiner* — Ko-Wei Lin
(74) *Attorney, Agent, or Firm* — Christopher Pilling

(57) ABSTRACT

A chimney starter booster has an air intake port and an air output port connected by internal ducting in the booster's housing. The air intake port is configured to accept a wireless fan blower. The fan blower supplies directed air through the ducting and out the air output port containing an air deflecting nozzle. A standard chimney starter sits on a top portion of the booster's housing, such that the directed air enters the bottom of the chimney starter to accelerate the burning of the charcoal.

7 Claims, 6 Drawing Sheets

CHIMNEY STARTER BOOSTER

CROSS-REFERENCE TO RELATED APPLICATIONS

The present invention is a continuation in part application claiming priority to Ser. No. 16/680,326 filed Nov. 11, 2019 entitled "Improved Chimney Starter", herein incorporated in its entirety at least by reference.

BACKGROUND OF THE INVENTION

1. Field of the Invention

The present invention generally relates to igniting charcoal and more particularly to a chimney starter booster configured to be used with a chimney starter.

2. Description of Related Art

Chimney starters, also called charcoal chimneys, are devices used to ignite charcoal, such as lump charcoal or charcoal briquettes. Typically, a chimney starter is filled with charcoal, then paper or other fuel is placed below the charcoal. The charcoal and ignition source is usually separated by a grate. The ignition source is configured to ignite the charcoal, and then once all the charcoal is burning, some or all of the charcoal may be deposited in a grill for use. In most environmental conditions, the charcoal will be ready in about 10 to 20 minutes. Consequently, there is room for improvement in this field to reduce the time required to prepare the charcoal for the grill.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a particular object of the invention to provide a chimney starter booster configured to work with a standard chimney starter sold in the market. In order to do so, a chimney starter booster is provided comprising a housing; an air intake port provided on a portion of the housing, wherein the air intake port is configured to accept a fan blower such that blown air is configured to be blown through the air intake port; an air output port provided on a portion of the housing; an air duct configured to connect the air intake port to the air output port and direct the blown air; and, the air output port configured to receive a chimney starter having charcoal, such that the directed blown air is directed through the chimney starter, wherein the directed air accelerates the burning of the charcoal.

In one embodiment, the housing includes a flat top surface and a flat top bottom surface, the flat top surface configured to receive a bottom surface of the chimney starter. In one embodiment, the air output port is defined by a protruding output cylinder. In another embodiment, the protruding output cylinder is sized and shaped to receive a cylindrical housing of the chimney starter. In one embodiment, the protruding output cylinder includes a grate configured to prevent fallen charcoal from entering the air duct. In yet another embodiment, an air flow deflector nozzle positioned at the end of the air duct approximate to the air output port is provided. In one embodiment, the air flow deflector nozzle is configured to produce a number of air streams from the directed blown air such that the directed blown air is spread out when passing through the chimney starter.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a chimney starter booster.

Figure 1:
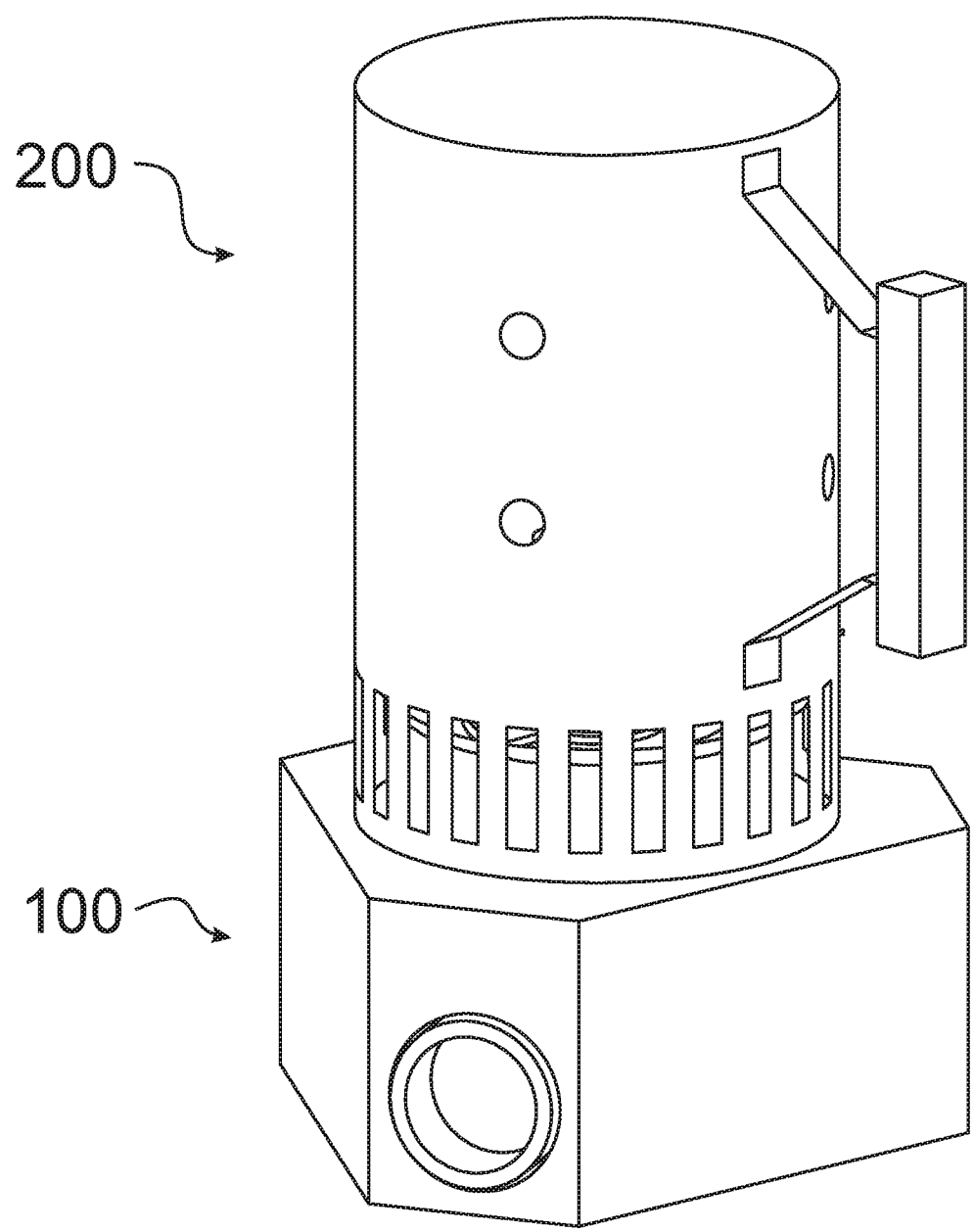
FIG. 1 is a perspective view of the chimney booster for use with a chimney starter according to an embodiment of the present invention.
Figure 2:
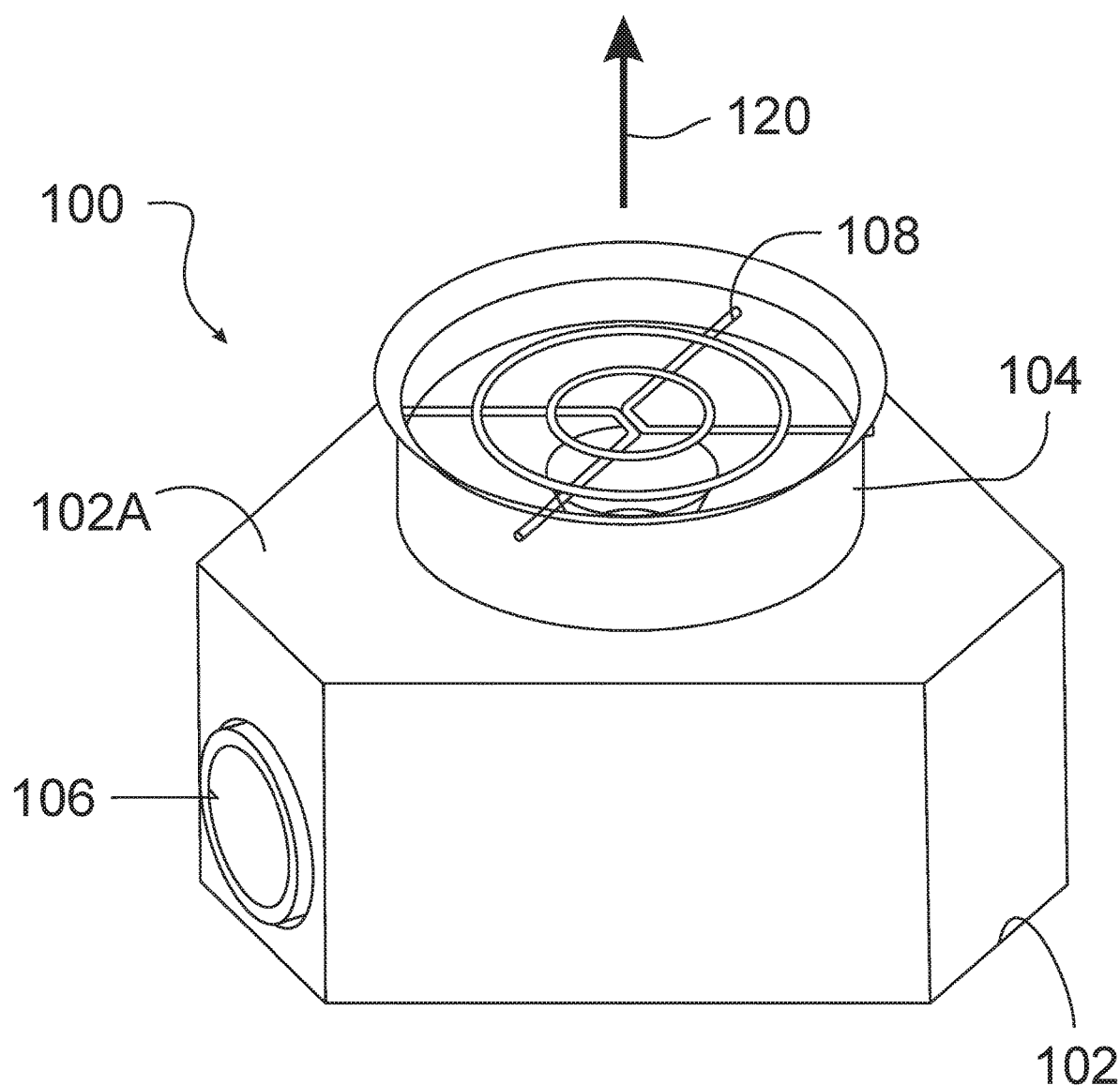
FIG. 2 is a perspective view of the chimney booster according to an embodiment of the present invention.
Figure 3:
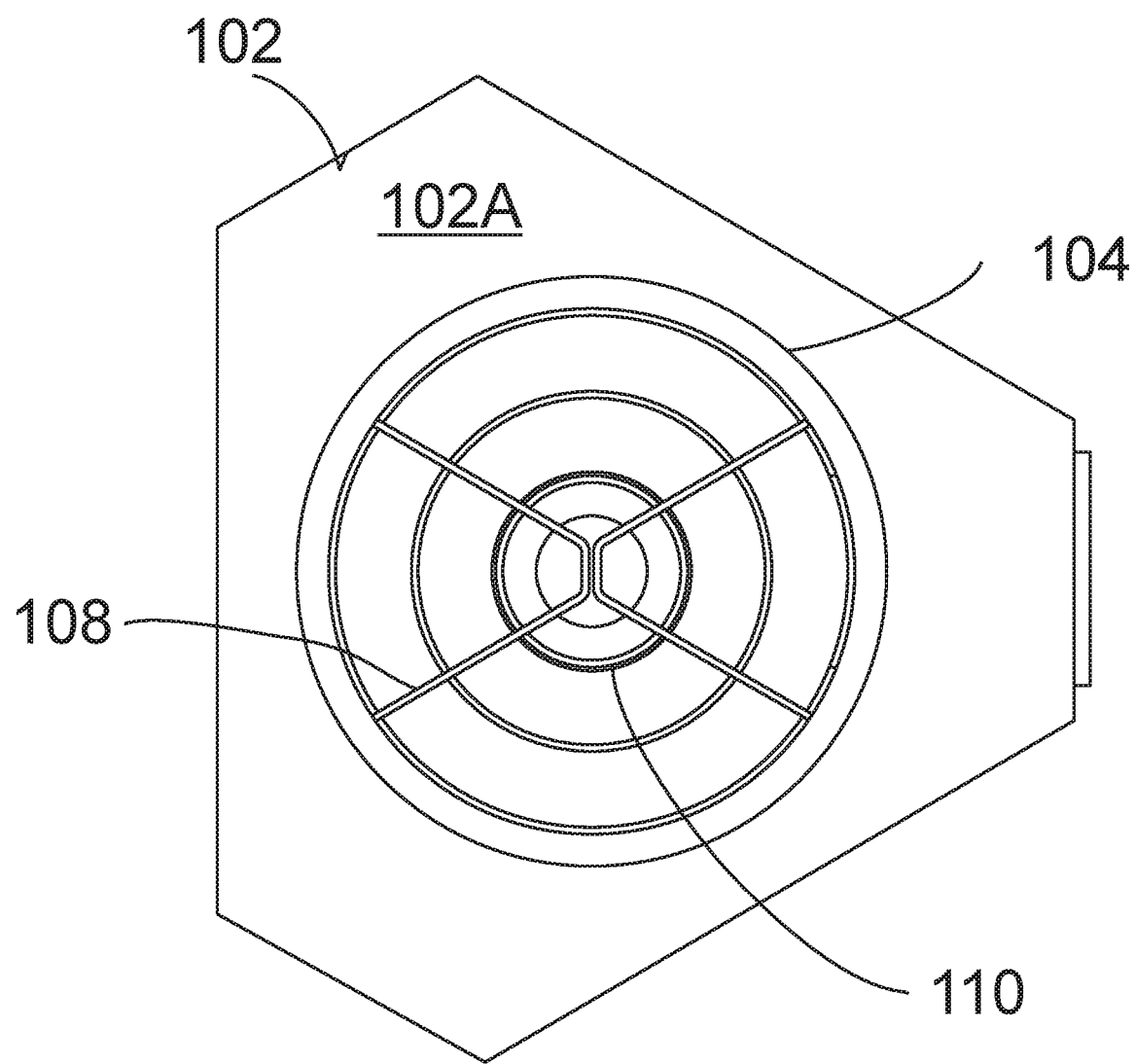
FIG. 3 is a top of the chimney booster according to an embodiment of the present invention.

Referring now to any of the accompanying FIGS. 1-3, a chimney starter booster 100 for use with a chimney starter 200 is illustrated. The booster 100 comprising housing 102, The housing, although illustrated as triangular, may be a variety of shapes. However, a flat top surface 102A and flat bottom surface (not illustrated) is preferred. The booster housing, and the flat bottom surface is configured to rest on a ground surface, while the flat top surface is configured to support the chimney starter during use. More specifically, the chimney starter is configured to sit on the top surface 102A of the booster during use. A protruding cylindrical section 104 of the booster s configured to be covered by the chimney starter during use, ensuring the chimney starter is correctly aligned on top of the booster such that the directed airflow 120 enters the bottom portion of the chimney booster (Best seen in FIG. 6). The protruding cylindrical section 104 defines an air output port. The operation of the components will be discussed in further detail below.

Figure 6:
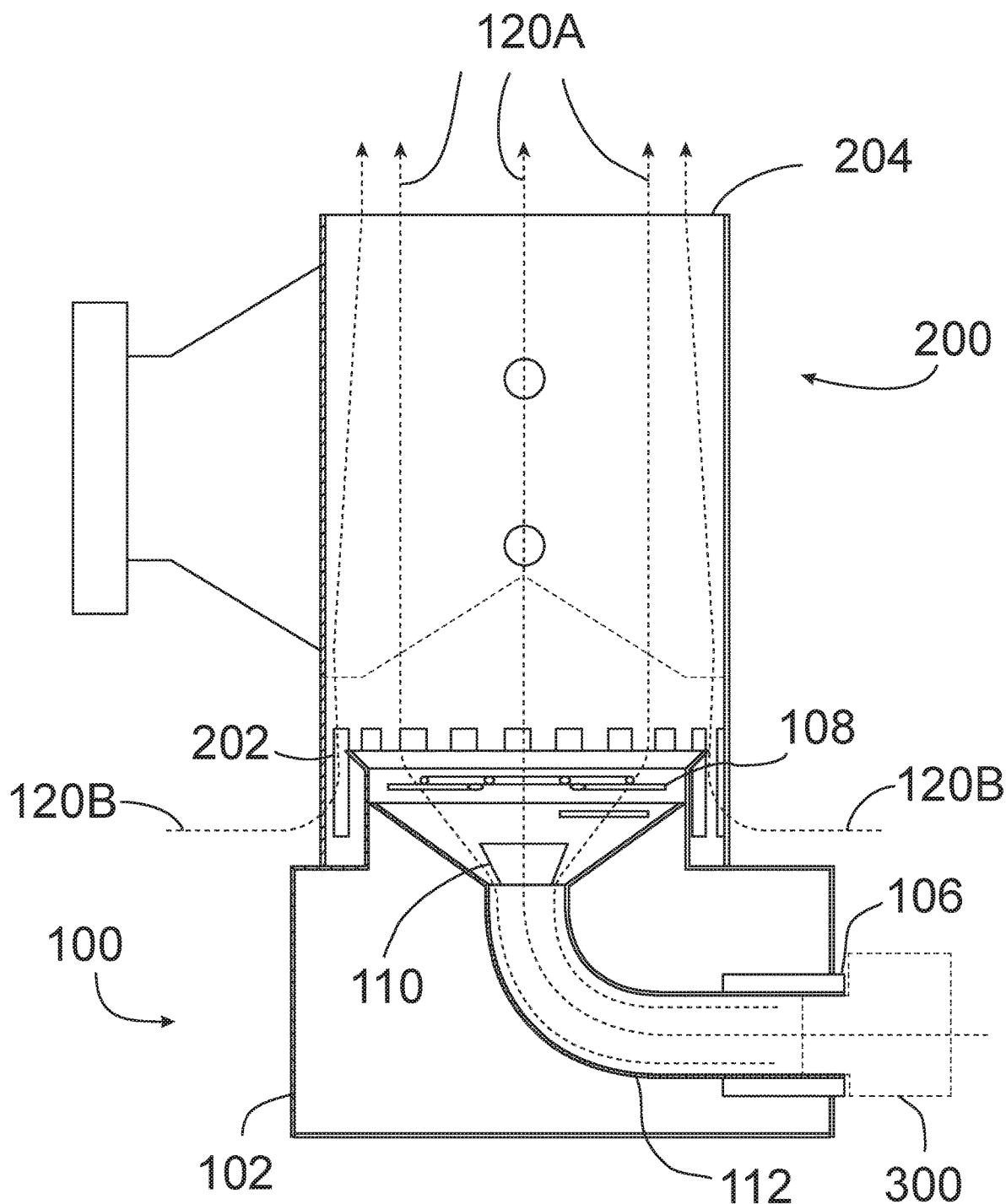
FIG. 6 is a sectional view of the chimney booster with an attached fan blower for use with a chimney starter according to an embodiment of the present invention.

In some embodiments, the protruding cylindrical section 104 comprises grate 108, ensuring charcoal from the chimney does not unintentionally enter the internal structure of the booster during use. The protruding cylindrical section is constructed of a diameter slightly smaller than the diameter of the chimney starter 100. Although not illustrated, in some embodiments, temporary fastening devices or elements may be provided to temporary secure the chimney starter to the booster. Further, the chimney starter booster comprises an air intake port 106 on a portion of the housing 102. The air intake port is in communication with the air output port via an air duct 112 (FIG. 6). The air intake is configured to receive a fan blower, which will be discussed below.

Figure 4:
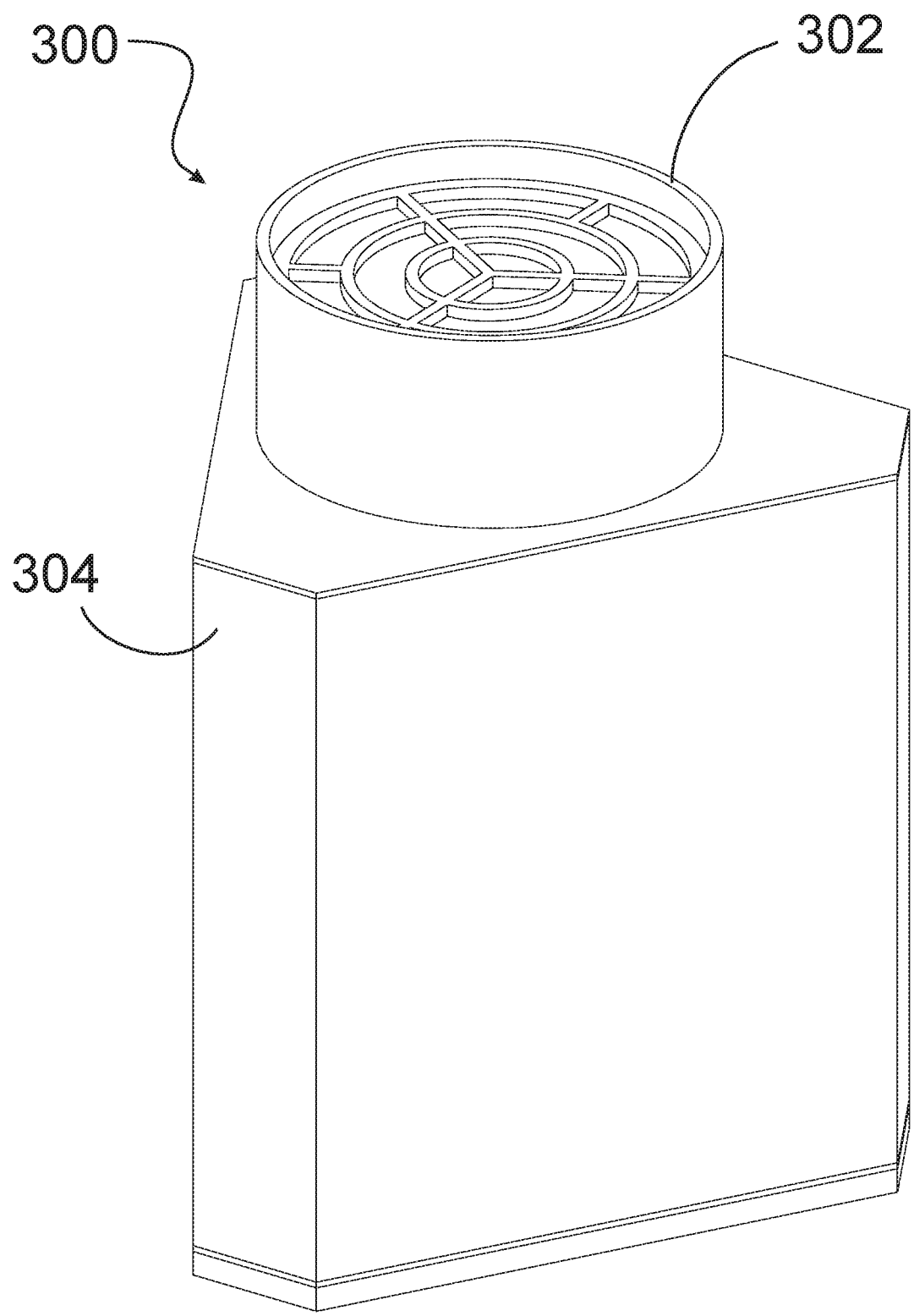
FIG. 4 is a perspective view of the fan blower according to an embodiment of the present invention.
Figure 5:
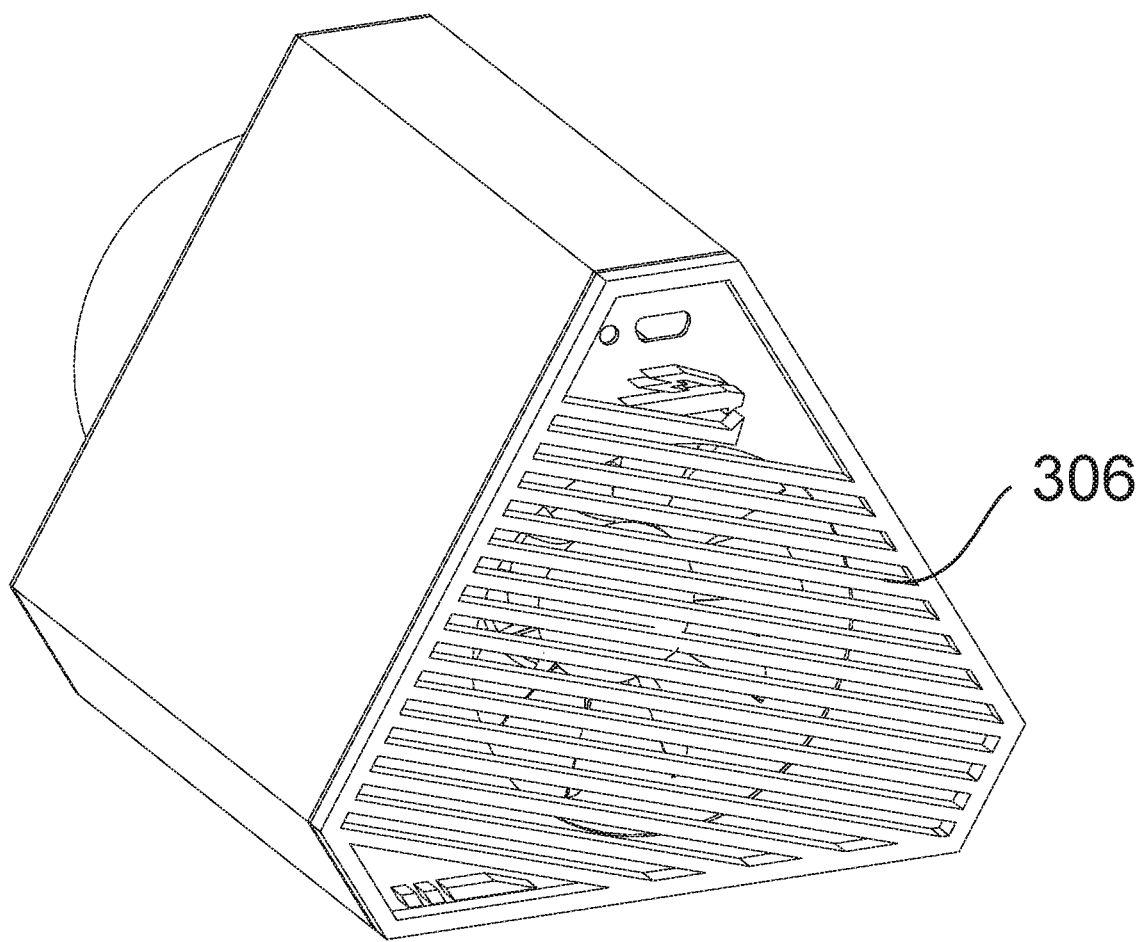
FIG. 5 is an alternative perspective view of the fan blower according to an embodiment of the present invention.

Referring now to FIGS. 4-5, a fan blower 300 is illustrated. The fan blower comprises a fan body 304, fan blower 302, and fan intake 306. The fan blower is configured to blow air into the booster 100. In one embodiment, the fan blower is triangular having flat corners. It should be understood that the shape and construction of the fan blower may vary without departing from the scope of the invention. For instance, the fan body may be circular, square, triangular with rounded corners, etc. The critical aspect is that the fan blower is configured to be positioned in the air intake port 106 on the housing 102 of the booster 100, as seen in FIG. 6. Advantageously, the fan blower is wireless, and is configured to operate via batteries, such as rechargeable or replaceable batteries. In alternative embodiments, the fan blower may include a power cord.

FIG. 6 is a section view of the chimney booster 100 with an attached fan blower 300 for use with a chimney starter 200 according to an embodiment of the present invention. Referring now to FIG. 6, as previously discussed, the fan blower is configured to attach to the air intake port 106 of the booster housing 102. In one embodiment, the air duct 112 is configured to direct the blown air from the fan blower 300 through the booster 100. In one embodiment, an air flow deflector (nozzle) 110 is positioned at an end portion of the air duct 112 and is configured to split the directed air into several air streams 120A when entering the bottom of the chimney starter. Some airflow 120B will enter through the air vents 202 positioned on the bottom portion of the chimney starter.

During typical operation, charcoal (not illustrated) is placed on a grate inside the chimney as well known in the art. Next, a fuel fire starter source, e.g. paper, fuel cube, etc., is ignited which starts to ignite the charcoal approximate to the source. Next, if not already done so, the chimney starter is positioned on top of the booster 100 as previously described. Next, the fan blower is turned on, wherein the fan blower directs air 102A through the air duct 112, up through the cylindrical housing of the chimney starter 200, and out the opening 204. The directed air is heated as the charcoal gets ignited and burned, wherein the heated air (oxygenated air) accelerates the combustion of the remaining charcoal. During operation all the charcoals are ready to be transferred to the grill in approximately three minutes. This is much faster than using a chimney starter without the use of the booster and blower. The charcoal is ready when ignited is relatively covered with gray ash as well known in the art.

In one embodiment, the air intake port 106 is heat resistant to prevent the fan blower from overheating during operation. In one embodiment, one or more airflow splitters may be positioned in the air intake port 114 to split the directed air into multiple streams prior to reaching the air deflector 110. The directed airflow also helps the charcoal burn evenly and clean compared to a basic chimney starter.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

In addition, reference to "first," "second," "third," and etc. members throughout the disclosure (and in particular, claims) are not used to show a serial or numerical limitation but instead are used to distinguish or identify the various members of the group.

What is claimed is:

1. A chimney starter booster comprising:
    a housing having a top surface and a side surface, wherein the side surface is perpendicular to the top surface;
    an air intake port provided on the side surface of the housing;
    an air output port provided on the top surface of the housing;
    an air duct connecting the air intake port to the air output port;
    a portable fan blower configured to be removably positioned within the air intake port such that blown air is directed through the air duct:
    the air output port configured to receive a chimney starter having charcoal, such that the directed blown air is directed through the chimney starter, wherein the directed air accelerates the burning of the charcoal; wherein the air duct extends from the air intake port, and then curved upwardly toward the air output port.

2. The chimney starter booster of claim 1, wherein the air output port is defined by a protruding output cylinder.

3. The chimney starter booster of claim 2, wherein the protruding output cylinder is sized and shaped to receive a cylindrical housing of the chimney starter.

4. The chimney starter booster of claim 2, wherein the protruding output cylinder includes a grate configured to prevent fallen charcoal from entering the air duct.

5. The chimney starter booster of claim 1, further comprising an air flow deflector positioned at an end portion of the air duct.

6. The chimney starter booster of claim 5, wherein the air flow deflector is configured to produce a number of air streams from the directed blown air such that the directed blown air is spread out when passing through the chimney starter.

7. The chimney starter booster of claim 1, wherein the air intake port is heat resistant to prevent the portable fan blower from overheating during operation.

* * * * *